(12) United States Patent
Blessing et al.

(10) Patent No.: US 7,883,111 B2
(45) Date of Patent: Feb. 8, 2011

(54) GAS GENERATOR

(75) Inventors: Uwe Blessing, Nuremberg (DE); Jochem Gaertner, Nuremberg (DE); Peter Lehniger, Erlangen (DE); Marc Alexander Winterhalder, Garching / Alz (DE)

(73) Assignee: Delphi Technologies, Inc., Troy, MI (US)

( * ) Notice: Subject to any disclaimer, the term of this patent is extended or adjusted under 35 U.S.C. 154(b) by 1172 days.

(21) Appl. No.: 11/288,955

(22) Filed: Nov. 29, 2005

(65) Prior Publication Data

US 2006/0117982 A1 Jun. 8, 2006

(30) Foreign Application Priority Data

Dec. 8, 2004 (EP) .................................. 04029064

(51) Int. Cl.
*B60R 21/26* (2006.01)
(52) U.S. Cl. .................. 280/741; 280/736; 102/530
(58) Field of Classification Search ............... 102/530; 280/728.1–741
See application file for complete search history.

(56) References Cited

U.S. PATENT DOCUMENTS

| | | | | | |
|---|---|---|---|---|---|
| 4,370,930 | A | * | 2/1983 | Strasser et al. ............... | 102/530 |
| 5,489,118 | A | * | 2/1996 | Carothers et al. ............ | 280/741 |
| 5,622,380 | A | * | 4/1997 | Khandhadia et al. ......... | 280/736 |
| 5,628,528 | A | * | 5/1997 | DeSautelle et al. ........... | 280/736 |
| 5,851,027 | A | * | 12/1998 | DiGiacomo et al. .......... | 280/736 |
| 6,019,389 | A | * | 2/2000 | Burgi et al. .................. | 280/736 |
| 6,032,979 | A | * | 3/2000 | Mossi et al. ................. | 280/741 |
| 6,053,531 | A | * | 4/2000 | Katsuda et al. .............. | 280/741 |
| 6,149,193 | A | * | 11/2000 | Canterberry et al. ......... | 280/741 |
| 6,168,200 | B1 | * | 1/2001 | Greist et al. ................. | 280/736 |
| 6,189,922 | B1 | * | 2/2001 | Parks et al. .................. | 280/735 |
| 6,189,927 | B1 | * | 2/2001 | Mossi et al. ................. | 280/741 |
| 6,364,354 | B1 | | 4/2002 | Nakashima et al. .......... | 280/736 |
| 6,406,053 | B1 | * | 6/2002 | Bayer et al. .................. | 102/530 |
| 6,422,601 | B1 | * | 7/2002 | Quioc .......................... | 280/741 |
| 6,447,007 | B1 | * | 9/2002 | DiGiacomo et al. .......... | 280/741 |
| 6,491,321 | B1 | * | 12/2002 | Nakashima et al. .......... | 280/736 |
| 6,543,805 | B2 | * | 4/2003 | McFarland et al. ........... | 280/736 |
| 6,648,370 | B2 | * | 11/2003 | Koga et al. ................... | 280/736 |
| 6,659,500 | B2 | * | 12/2003 | Whang et al. ................ | 280/741 |
| 6,709,012 | B1 | * | 3/2004 | Tanaka et al. ................ | 280/736 |
| 6,722,694 | B1 | * | 4/2004 | Nakashima et al. .......... | 280/736 |
| 6,877,435 | B2 | * | 4/2005 | Daoud ......................... | 102/530 |
| 7,055,855 | B2 | * | 6/2006 | Nakashima et al. .......... | 280/736 |
| 2002/0149177 | A1 | * | 10/2002 | Rose et al. ................... | 280/728.2 |
| 2003/0057688 | A1 | * | 3/2003 | Koga et al. ................... | 280/736 |

(Continued)

FOREIGN PATENT DOCUMENTS

EP          1293394 A          3/2003

(Continued)

*Primary Examiner*—Troy Chambers
(74) *Attorney, Agent, or Firm*—Thomas N. Twomey

(57) ABSTRACT

The present invention relates to a gas generator, in particular for airbag modules in motor vehicles, comprising two generator stages each of which includes in its pressure housing at least one igniter, at least one propellant charge and at least one combustion chamber. An inner generator stage is arranged at least substantially inside an outer generator stage and the two generator stages are arranged at least partly in a common filter housing together with a common filter unit arranged outside a pressure housing of the outer generator stage.

39 Claims, 1 Drawing Sheet

U.S. PATENT DOCUMENTS

| | | | |
|---|---|---|---|
| 2003/0137138 A1* | 7/2003 | Nakashima et al. | 280/741 |
| 2004/0046373 A1 | 3/2004 | Wang et al. | 280/741 |
| 2004/0056458 A1* | 3/2004 | Daoud | 280/736 |
| 2004/0124618 A1* | 7/2004 | Schonhuber et al. | 280/736 |
| 2004/0145166 A1* | 7/2004 | Smith | 280/736 |
| 2007/0044675 A1* | 3/2007 | Burns et al. | 102/530 |

FOREIGN PATENT DOCUMENTS

| | | |
|---|---|---|
| EP | 1354774 A | 10/2003 |
| EP | 1386793 A | 4/2004 |

\* cited by examiner

GAS GENERATOR

TECHNICAL FIELD

The present invention relates to a gas generator, in particular for airbag modules in motor vehicles, comprising two generator stages each of which includes in its own pressure housing at least one igniter, at least one propellant charge and at least one combustion chamber.

BACKGROUND OF THE INVENTION

Such multi-stage gas generators are already known from the prior art. One or more generator stages can be ignited depending on the respective demands. The same gas generator can thus be used in vehicle applications for different airbag modules and different vehicle types. However, with the aid of a corresponding control, a decision can also be made with a gas generator installed with an airbag module in a vehicle in dependence on the magnitude of the impact, on different accident conditions or on the situation of use, e.g. the manner of seat occupation, which generator stages are ignited at which time.

With such multi-stage gas generators, it must be prevented by the geometrical arrangement and the design of the individual generator stages that, when one generator stage is ignited, the propellant charge of the other generator is also unintentionally ignited (sympathetic ignition). The pressure housings of the individual generator stages must therefore be correspondingly insulated from one another, with the weight of the gas generator, however, simultaneously being kept as low as possible. Since such gas generators are mass products produced in very high volumes, the manufacture of the generator should moreover be as simple as possible despite these aforementioned demands. As few different parts as possible should in particular be used.

SUMMARY OF THE INVENTION

It is the object of the present invention to provide a gas generator of the initially named kind which is as light and as compact as possible in which the aforesaid problem of cross-ignition does not occur and which can nevertheless be produced in as simple and as cost-favorable manner as possible in high volumes.

This object is satisfied in accordance with the invention in that an inner generator stage is arranged at least substantially inside an outer generator stage and in that the two generator stages are arranged at least partly, in a common filter housing together with a common filter unit arranged outside a pressure housing of the outer generator stage.

The arrangement of the two generator stages inside one another (so-called "stage-in-stage" design) saves room and permits an arrangement overall which is as symmetrical as possible. An additional chamber, which the gases have to flow through, can be provided outside the combustion chambers at the interior of the filter housing due to the arrangement of the two generator stages in a common filter housing including the filter unit. Said gases are not only filtered in this process, so that a gas as free of particles as possible can enter into the airbag, but can also cool down. Since the two generator stages each have their own pressure housing and a common housing with a separating wall is, for instance, not provided, the gas generator can be made up in modular form of different housing modules. For example, a pressure housing of always the same type for the outer generator housing can be combined with different pressure housings for the inner generator stage so that the costs for the manufacture of different gas generators can be reduced. Due to the arrangement of the filter unit outside the outside pressure housing, the latter can be made relatively small, whereby material and weight are saved. It was recognized that it is not necessary to arrange the filter unit inside the outer pressure housing, but that it is rather sufficient to provide a comparatively thin-walled filter housing which can then moreover advantageously be used to satisfy specific additional functions.

Advantageous embodiments of the invention are described in the dependent claims and in the description in conjunction with the enclosed drawings.

In accordance with an embodiment of the invention preferred due to its simplicity, the pressure housing of the outer generator stage is cylindrical and the igniters of the two generator stages are arranged at least approximately symmetrically with respect to a central axis of this pressure housing. This arrangement of the igniters permits an at least largely symmetrical weight distribution inside the pressure housing. The cylindrical shape of the outer pressure housing moreover permits a rotationally symmetrical outflow of the gases generated in the generator.

The two generator stages are preferably cylindrical.

An outflow behavior which is symmetrical to a high degree can be obtained when the central axes of the two igniters and the central axes of the housings and of the filter unit lie in a common plane.

In accordance with a further advantageous embodiment of the invention, the inner generator stage almost completely fills the outer generator stage. This provides an optimum space utilization since a region above the inner stage and belonging to the outer generator stage would not be utilized ideally for technical flow reasons. The probability is moreover reduced that, on an ignition of only the outer generator stage, the inner generator stage is unintentionally ignited as well, since at least the upper wall of the inner generator stage is not directly heated by the combusting propellant charge.

The utilization of the space present can furthermore be optimized in that the filter unit and the two generator stages at least substantially fully fill the filter housing.

In accordance with a further preferred embodiment of the invention, the filter unit is in ring shape and surrounds the outer generator stage. Such an arrangement is again characterized by its symmetry. A ring-shaped filter unit is moreover comparatively simple to assemble.

The filter ring preferably has a smaller axial length than the outer generator stage. Installation space and weight can thereby be saved overall when it is not necessary due to the respectively desired filter effect for a filter ring to extend over the whole axial length of the outer generator stage.

To guide the gas from the outer generator stage through the filter and, finally, out of the gas generator into the airbag to be inflated, in accordance with a preferred embodiment of the invention, outflow openings are provided in the pressure housing of the outer generator stage which are arranged at the level of the lower end of the filter unit and open into a space receiving the filter unit. This space is bounded from the outside by the filter housing and does not have to be completely filled by the filter unit. The generated gas inside this space can cool inside the same due to the expansion before exiting the gas generator. Outflow openings arranged at the level of the lower end of the filter unit in conjunction with skillfully arranged outflow openings of the filter housing permit a relatively long filter path and thus a particularly reliable filtering and a particularly effective cooling of the gas.

It is particularly advantageous for the mentioned outflow openings of the pressure housing of the outer generator stage to be lower than outflow openings of the filter housing. The gas flowing out of the outer generator stage through the lower lying outflow openings of the pressure housing in this case flows upwardly through the filter before exiting the filter housing. Since it is generally more advantageous to arrange the outflow openings through which the gas exits the gas generator as far upwardly as possible, a long filter path can be realized in a particularly elegant manner with such an arrangement, without the dimensions of the gas generator being unnecessarily enlarged.

In order to generate a flow path for the gas flowing out of the inner generator stage which is as long as possible, outflow openings of the inner pressure housing are preferably disposed approximately at the level of the outflow openings of the filter housing. With outflow openings of the filter housing arranged relatively far upwardly and with outflow openings of the outer pressure housing disposed comparatively far downwardly, the gas of the inner generator stage must therefore first move downwardly from the outflow openings of the inner generator stage to the outflow openings of the outer generator stage, from where it then again moves upwardly through the filter and then exits the filter housing approximately at the level of the outflow openings of the inner generator stage.

The outflow openings of the inner generator stage are preferably likewise aligned radially.

In accordance with a further preferred embodiment of the invention, the filter housing has a radially widened portion at the level of the filter unit. Overall, the filter housing can fit snugly substantially from the outside to the pressure housing of the outer generator stage in order to minimize the space requirement, with the said radially widened portion being able to be made to receive the filter unit of in particular ring shape in the region in which the filter unit is arranged.

The igniters of the two generator stages can be secured to a common base plate, which simplifies the manufacture of the gas generator. The mechanical stability of the total generator is moreover increased.

It is very particularly advantageous to form weld connections between the components forming the pressure housings in each case by the same welding process in order to simplify the manufacturing process. In particular capacitor discharge welding, laser welding or friction welding can be considered. The use of the same welding process for all connections saves time and thus costs in the manufacture of the gas generator in accordance with the invention. Depending on the process used and on the geometry of the generator stages, optionally even a plurality of weld connections can be formed in one workstep.

The filter housing is preferably secured to the previously manufactured assembly of the two generator stages with the aid of a reshaping operation, for example, a rolled joint or a beaded joint. Such a fastening can be realized in a simple manner. Alternatively or additionally, the filter housing can, however, also be welded to the base plate and/or to the generator stages.

The filter housing is preferably made as an outer housing of the generator. An additional outer housing of the generator is therefore not necessary, which saves material and thus costs, weight and installation space.

In accordance with a preferred further development of the invention, the filter housing can have a securing flange to attach the gas generator to an airbag module. The filter housing can thus be used as an outer housing of the generator without an additional connection piece being necessary for the attachment to the airbag module.

It is particularly advantageous for outflow openings of the filter housing to be provided in an upper region of the filter unit. Such an arrangement is in particular to be preferred when the filter housing also forms the outer housing of the generator, since the gas should flow out of the gas generator as far toward the top as possible, but still in a radial direction, for an optimum unfolding of the airbag.

In accordance with a further preferred embodiment of the invention, the filter housing can be expanded by the gas pressure generated by means of the generator stages so that it can assist a pressure buffer function. The pressure of the gas flowing out can be reduced by such an expansion of the filter housing such that the airbag is inflated with a lower force than with a filter housing of a less resilient design. This is above all of particular importance at high environmental temperatures, in comparison with lower environmental temperatures, which have the consequence of a higher maximum pressure which would have a full effect on the inflation behavior of the airbag without a pressure buffer. The dilatability of the filter housing can be set such that the inflation behavior is less dependent on the environmental temperature, that is such that the airbag does not behave too "aggressively" in summer and behaves sufficiently "dynamically" in winter. It must also be taken into account here that current regulations require a problem-free function and a simultaneous observation of safety requirements over a temperature range from −35° C. to +85° C., i.e. the gas generator must also be designed for very low temperatures. The pressure buffer function of the filter housing in particular ensures that the increased pressure development does not result in a bursting of the filter housing at very high temperatures.

In accordance with an advantageous further development of the invention, this filter housing can be made so that it surrounds the generator stages, the filter unit and a base plate common to the generator stages like a clamp. This clamp form can be established, for example, by a roll at the lower side of the filter housing. The stability of the total gas generator is increased and the filter housing provided with an additional function by such an arrangement.

BRIEF DESCRIPTION OF THE DRAWINGS

The present invention will be explained in more detail in the following with reference to a preferred embodiment and to the two enclosed Figures. The Figures show in detail.

DESCRIPTION OF THE PREFERRED EMBODIMENT

Figure 2:
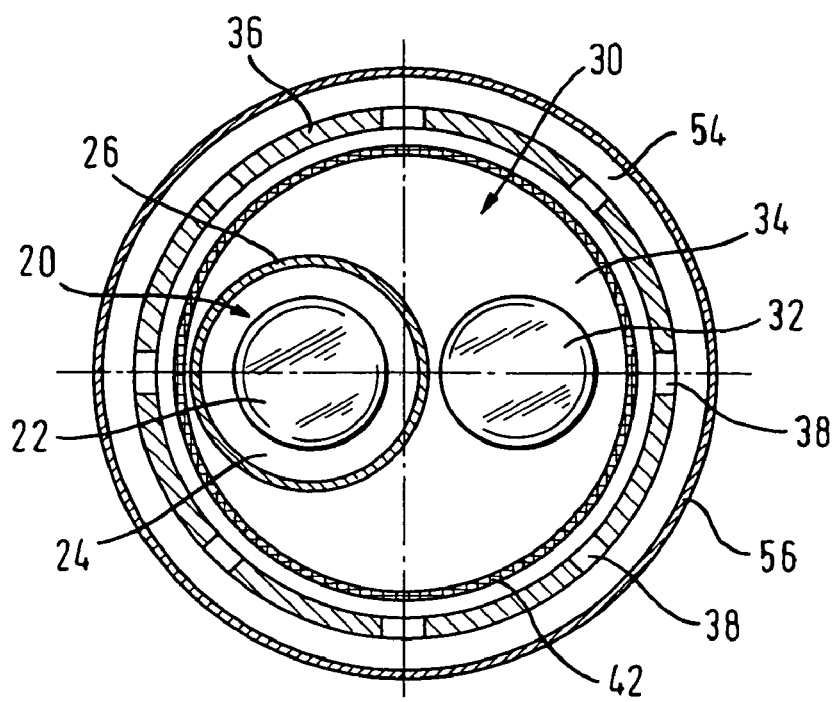
FIG. 2 is a radial section through the gas generator of FIG. 1 in a partly simplified representation.

FIG. 2 illustrates the basic design of the two-stage gas generator which has a substantially cylindrical shape overall. An inner generator stage 20, which is bounded by a cylindrical pressure housing 26, is arranged asymmetrically inside a larger cylindrical outer generator stage 30.

The interior space of the pressure housing 26 of the inner generator stage 20 forms a combustion chamber 24 in which a propellant charge not shown in the Figures is stored in the form of pressed fuel pellets. As can better be recognized in FIG. 1, the outer generator stage 30 has a cylindrical pressure housing 36 whose inner space forms a combustion chamber 34 in which a second propellant charge, which is likewise not shown, of the same type is disposed. The outer pressure housing 36 has a much larger wall thickness than the pressure housing 26 of the inner generator stage 20 since, due to the lower wall surface of the pressure housing 26 of the inner generator stage 20, a lower wall thickness is sufficient to withstand the pressures which occur.

As is easily recognizable in FIG. 2, two igniters 22, 32 each having a circular cross-section are arranged approximately symmetrically to a central axis of the pressure housing 36 of the outer generator stage 30. The igniter 32 disposed at the right in the two Figures belongs to the outer generator stage 30, whereas the igniter 22 shown at the left belongs to the inner generator stage 20 and is arranged centrally in its pressure housing 26.

The inner generator stage 20 substantially lies in the half of the gas generator or of the outer generator stage 30 disposed at the left in the Figures. The pressure housing 26 of the inner generator stage 20 extends in height, as can be recognized in FIG. 1, almost up to the upper side of the pressure housing 36 of the outer generator stage 30.

A collection grating 42 extending at a low spacing from the side wall of the pressure housing 36 of the outer generator stage 30 lies regionally between the inner generator stage 20 and the pressure housing 36. The fuel pellets of the propellant charges are prevented by the collection grating 42 from clogging outflow openings 38 formed in the pressure housing 36 and described further below.

As can easily be recognized in FIG. 2, a filter housing 56 is arranged coaxially around the pressure housing 36 of the outer generator stage 30. Both generator stages 20, 30 lie completely inside the filter housing 56 which is provided at the top and bottom with a relatively large opening to save material and weight and thus practically represents a housing ring which radially completely surrounds and upwardly and downwardly engages around the arrangement of pressure housing 36 and a base plate 46 described in more detail in the following. The space 54, which is bounded outwardly by the filter housing 56 and inwardly by the pressure housing 36 of the outer generator stage 30, serves i.a. for the reception of a filter unit 50 explained in the following.

The filter unit 50, which is not shown in FIG. 2 for reasons of simplicity, is arranged in ring-shape between the pressure housing 36 of the outer generator stage 30 and the filter housing 56. The filter ring 50 extending around the pressure housing 36 does not extend beyond the total height of the pressure housing 36, but rather has an axial extent which only amounts to approximately two thirds of the total axial extent of the gas generator.

Figure 1:
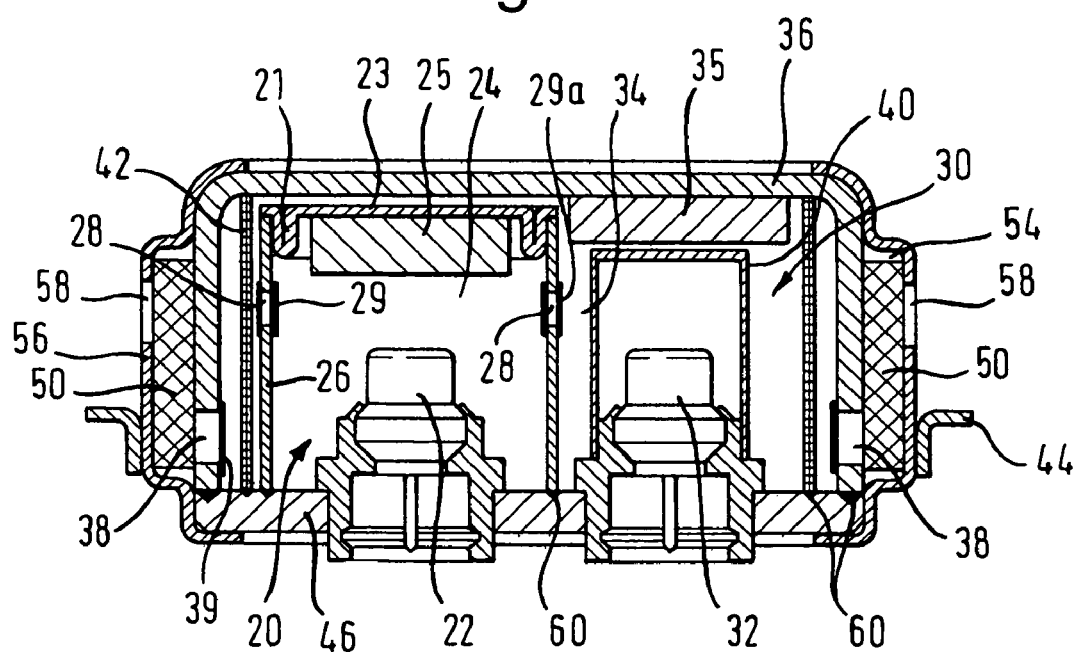
FIG. 1 is an axial section through a gas generator in accordance with the invention.

The filter housing 56 having a substantially lower wall thickness than the pressure housing 36 of the outer generator stage 30 fits snugly to it from the outside, as shown in FIG. 1, with a radially widened portion being formed in the region of the filter unit 50 which extends, like the filter unit 50, around the pressure housing 36 in the manner of a ring and serves for the reception of the filter unit 50. The contour of the filter housing 56 thus substantially corresponds to the outer contour of the pressure housing 36 with the filter ring 50 surrounding it.

As in particular FIG. 2 shows, the central axes of the housings 26, 36, 56, of the ring-shaped filter unit 50, of the collection grating 42 and of the igniters 22, 32 lie in a common plane, with the housings 36, 56, the filter unit 50 and the collection grating 42 being arranged concentrically and their central axes consequently coinciding.

It can be recognized in FIG. 1 that the outer generator stage 30 is fitted with a booster container 40 which is pushed over the igniter 32 and likewise has a cylindrical shape. This booster container 40, just like the remaining space of the combustion chamber 34, is filled with fuel pellets and only opens when a specific threshold pressure has built up such that a very high pressure can be built up very quickly in the combustion chamber 34. Due to the lower volume of the inner generator stage 20, it can do without such a booster container; optionally, however, a booster container can likewise be pushed over the igniter 22 of the inner generator stage 20.

Volume compensation pieces 25 and 35 are provided in both the smaller inner generator stage 20 and in the outer generator stage 30 respectively. They prevent a movement of the fuel pellets of the propellant charges so that these cannot be damaged by friction which occurs and so that an unwanted noise development is avoided.

The pressure housing 26 of the inner generator stage 20 terminates at its upper side at a cover 23 having a circular cross-section which has a peripheral double fold 21 U-shaped in section at its outer rim. This improves the sealing of the pressure housing 26 at its upper rim and gives the cover 23 a certain flexibility. After ignition of the inner generator stage 20, the cover 23 is presses upwardly by the pressure prevailing in the pressure housing 26 until it abuts the pressure housing 36 of the outer generator stage 30 after overcoming the axial intermediate space which is present. This movement of the cover 23 is made possible by its double fold 21 providing the required path length, without the sealing of the housing 26 being impaired due to the upwardly pressed cover 23. In contrast, on an ignition of the outer generator stage 30, the cover 23 is pressed onto the pressure housing 26 of the inner generator stage 20 by the pressure acting from the outside in particular due to the axial intermediate space so that the inner generator stage 20 is or remains reliably sealed.

The pressure housing 26 of the inner generator stage 20 has radial outflow openings 28 which are arranged in an upper region of the pressure housing 26. The outflow openings 28 are covered by an insulating film 29 at the inner side of the pressure housing 26. The insulating film 29 can either be made as a film ring and extend around the total periphery of the pressure housing 26, or every outflow opening 28 is covered by a separate insulation film 29. The insulation film 29 tears at a certain minimum pressure and thus has a similar effect to the booster container 40 described above: only when a certain minimum pressure has been built up can the gas flow out of the inner generator stage 20. The outflow openings 28 are covered by a reverse flow protection 29*a* from the outside. It can, for example, be a steel band which prevents a flowing of gas from the outer generator stage 30 into the inner generator stage 20 (reverse flow protection). It is avoided in this way that, after an ignition of the outer generator stage 30, the inner generator stage 20 is unintentionally ignited ("sympathetic ignition").

The already mentioned outflow openings 38 of the pressure housing 36 of the outer generator stage 30 are likewise radially aligned and lie approximately at a level with the lower end of the filter ring 50 in a lower region of the pressure housing 36. As can be seen in FIG. 2, the outflow openings 38 of the pressure housing 36 are distributed at uniform intervals over the total periphery of the cylindrical pressure housing 36. The outflow openings 38 are covered on the inner side of the pressure housing 36 by an insulating film 39 which has the same effect as the insulating film 29 described above for the outflow openings 28 of the inner generator stage 20.

The filter housing 56 likewise has outflow openings 58 which are located in the region of the upper end of the filter 50 and thus clearly above the outflow openings 38 of the pressure housing 36. The outflow openings 28 of the pressure housing 26 of the inner generator stage 20 are located approximately at the same level as the outflow openings 58 of the filter housing 56.

The two generator stages 20, 30 have a common, circular base plate 46 having cut-outs, likewise circular, intended to receive the igniters 22, 32. The igniters are pushed into these cut-outs and can be welded along its periphery, for example by means of a laser welding process, to the base plate 46.

The filter housing 56 engaging around the pressure housing 36 at the upper side moreover engages around the base plate 46 and thus forms an outer envelope surrounding the total gas generator like a clamp. The rim engaging around the base plate 46 can be established by a reshaping such as a rolling process or a flanging.

A flange 44 which serves for the attachment of the gas generator to an airbag module, is attached to the filter housing 56, which also forms the outer housing of the gas generator in the embodiment shown, whereby the filter housing 56 satisfies a further additional function.

The components which form the pressure housings of the two generator stages 20, 30 are welded together, with the same welding process being able to be used for all welding spots 60. The outer pressure housing 36, the collection grating 42 an the pressure housing 26 of the inner generator stage 20 are welded to the base plate 46. First, the pressure housing 26 of the inner generator stage 20 is preferably filled with a propellant charge and welded to the base plate 46 already provided with the igniters 22, 32. An assembly is formed by welding the collection grating 42 and the pressure housing 36 of the outer generator stage 30 to the base plate 46 over which the filter unit 50 and the filter housing 56 are then pushed. The filter housing 56 is secured to the base plate 46 in a last step by reshaping, for example by rolling. Alternatively or additionally, it can also be welded to the base plate 46. A connection of the components by means of capacitor discharge welding, laser welding or friction welding is in particular especially advantageous Different ignition sequences are now feasible for the described two-stage gas generator. On the one hand, only one stage, namely the outer generator stage 30, can be ignited, which is for example advantageous when it is a question of a driver airbag for a comparatively small driver sitting closely behind the steering wheel. Alternatively, both generator stages 20, 30 can be ignited offset in time or simultaneously. The time span between the first ignition and the second ignition can in particular lie in the range from 0 to 10 ms. The time for the maximum degree of filling of the airbag and the rate of the pressure increase can be matched to different conditions by a corresponding choice of this time span. Generally, with the described arrangement, the outer generator stage 30 is ignited first and then the inner generator stage 20. It would also be feasible first to ignite the inner generator stage 20, with the outer generator stage 30 then likewise being ignited shortly thereafter by the gas flowing in via the outflow openings 28 as a consequence of the heat development. However, the individual components can be strained comparatively greatly due to the pressure relationships prevailing in this case so that the reverse ignition order is preferred.

In particular on the ignition of both generator stages 20, 30, the common expansion space outside the pressure housing 36 serves not only for filtering, but also for the cooling down and mixing of the gases generated by the two generator stages 20, 30.

The invention claimed is:

1. A gas generator for generating an inflation gas for an inflatable cushion in a vehicle, comprising:
    an outer pressure stage comprising an outer pressure housing defining an outer combustion chamber and an outer outflow opening, an outer propellant charge disposed within the outer combustion chamber and an outer charge igniter effective to ignite said outer propellant charge;
    an inner pressure stage comprising an inner pressure housing disposed within the outer pressure housing and defining an inner combustion chamber and an inner outflow opening communicating said inner combustion chamber to the outer combustion chamber, an inner propellant charge disposed within the inner combustion chamber and an inner charge igniter effective to ignite said inner propellant charge;
    a filter housing disposed about the outer pressure housing and having a filter outflow opening; and
    a filter disposed between the outer pressure housing and the filter housing for filtering gas flowing from the outer outflow opening to the filter outflow opening,
    wherein the gas generator further comprises an outer chamber compensation piece and an inner chamber compensation piece, said outer chamber compensation piece being disposed within the outer combustion chamber opposite the outer charge igniter, and the inner chamber compensation piece being disposed within the inner combustion chamber opposite the inner charge igniter.

2. The gas generator in accordance with claim 1, wherein the outer pressure housing is cylindrical about an axis, and the outer charge igniter and the inner charge igniter are arranged symmetrically about the axis.

3. The gas generator in accordance with claim 2, wherein the outer pressure housing comprises a plurality of outer outflow openings disposed in a radial pattern.

4. The gas generator in accordance with claim 1, wherein the filter housing is ring shaped about the outer pressure housing.

5. The gas generator in accordance with claim 1, wherein the gas generator further comprises a collection grating disposed in the outer combustion chamber between the inner pressure housing and the outer pressure housing.

6. The gas generator in accordance with claim 1, further comprising a base plate, said base plate cooperating with the outer pressure housing to define the outer combustion chamber and the inner pressure housing to define the inner combustion chamber, said outer charge igniter and said inner charge igniter being mounted to said base plate.

7. The gas generator in accordance with claim 6, wherein the filter housing is disposed about the outer pressure housing and the base plate.

8. The gas generator in accordance with claim 7, wherein the filter outflow opening is spaced apart from the base plate, and the outer outflow opening is adjacent the base plate.

9. The gas generator in accordance with claim 8, wherein the inner outflow opening is spaced apart from the base plate.

10. The gas generator in accordance with claim 1, wherein the filter housing comprises a securing flange for attaching the gas generator to an air bag module.

11. The gas generator in accordance with claim 1, wherein the inner pressure stage comprises an insulating film affixed to an interior surface of the inner pressure housing and overlying the inner outflow opening, and a reverse flow protection affixed to an exterior surface of the inner pressure housing and overlying the inner outflow opening.

12. The gas generator in accordance with claim 1, said outer pressure stage further comprising an insulating film affixed to an interior surface of the outer pressure housing and overlying the outer outflow opening.

13. The gas generator in accordance with claim 1, wherein the inner pressure housing comprises a plurality of inner outflow openings.

14. A gas generator for generating an inflation gas for an inflatable cushion in a vehicle, comprising:
- an outer pressure stage comprising an outer pressure housing defining an outer combustion chamber and an outer outflow opening, an outer propellant charge disposed within the outer combustion chamber and an outer charge igniter effective to ignite said outer propellant charge;
- an inner pressure stage comprising an inner pressure housing disposed within the outer pressure housing and defining an inner combustion chamber and an inner outflow opening communicating said inner combustion chamber to the outer combustion chamber, an inner propellant charge disposed within the inner combustion chamber and an inner charge igniter effective to ignite said inner propellant charge;
- a filter housing disposed about the outer pressure housing and having a filter outflow opening; and
- a filter disposed between the outer pressure housing and the filter housing for filtering gas flowing from the outer outflow opening to the filter outflow opening,
- wherein the inner pressure stage comprises an insulating film affixed to an interior surface of the inner pressure housing and overlying the inner outflow opening, and a reverse flow protection affixed to an exterior surface of the inner pressure housing and overlying the inner outflow opening.

15. The gas generator in accordance with claim 14, wherein the outer pressure housing is cylindrical about an axis, and the outer charge igniter and the inner charge igniter are arranged symmetrically about the axis.

16. The gas generator in accordance with claim 15, wherein the outer pressure housing comprises a plurality of outer outflow openings disposed in a radial pattern.

17. The gas generator in accordance with claim 14, wherein the filter housing is ring shaped about the outer pressure housing.

18. The gas generator in accordance with claim 14, wherein the gas generator further comprises a collection grating disposed in the outer combustion chamber between the inner pressure housing and the outer pressure housing.

19. The gas generator in accordance with claim 14, wherein the gas generator further comprises an outer chamber compensation piece and an inner chamber compensation piece, said outer chamber compensation piece being disposed within the outer combustion chamber opposite the outer charge igniter, and the inner chamber compensation piece being disposed within the inner combustion chamber opposite the inner charge igniter.

20. The gas generator in accordance with claim 14, further comprising a base plate, said base plate cooperating with the outer pressure housing to define the outer combustion chamber and the inner pressure housing to define the inner combustion chamber, said outer charge igniter and said inner charge igniter being mounted to said base plate.

21. The gas generator in accordance with claim 20, wherein the filter housing is disposed about the outer pressure housing and the base plate.

22. The gas generator in accordance with claim 21, wherein the filter outflow opening is spaced apart from the base plate, and the outer outflow opening is adjacent the base plate.

23. The gas generator in accordance with claim 22, wherein the inner outflow opening is spaced apart from the base plate.

24. The gas generator in accordance with claim 14, wherein the filter housing comprises a securing flange for attaching the gas generator to an air bag module.

25. The gas generator in accordance with claim 14, said outer pressure stage further comprising an insulating film affixed to an interior surface of the outer pressure housing and overlying the outer outflow opening.

26. The gas generator in accordance with claim 14, wherein the inner pressure housing comprises a plurality of inner outflow openings.

27. A gas generator for generating an inflation gas for an inflatable cushion in a vehicle, comprising:
- an outer pressure stage comprising an outer pressure housing defining an outer combustion chamber and an outer outflow opening, an outer propellant charge disposed within the outer combustion chamber and an outer charge igniter effective to ignite said outer propellant charge;
- an inner pressure stage comprising an inner pressure housing disposed within the outer pressure housing and defining an inner combustion chamber and an inner outflow opening communicating said inner combustion chamber to the outer combustion chamber, an inner propellant charge disposed within the inner combustion chamber and an inner charge igniter effective to ignite said inner propellant charge;
- a filter housing disposed about the outer pressure housing and having a filter outflow opening; and
- a filter disposed between the outer pressure housing and the filter housing for filtering gas flowing from the outer outflow opening to the filter outflow opening,
- said outer pressure stage further comprising an insulating film affixed to an interior surface of the outer pressure housing and overlying the outer outflow opening.

28. The gas generator in accordance with claim 27, wherein the outer pressure housing is cylindrical about an axis, and the outer charge igniter and the inner charge igniter are arranged symmetrically about the axis.

29. The gas generator in accordance with claim 28, wherein the outer pressure housing comprises a plurality of outer outflow openings disposed in a radial pattern.

30. The gas generator in accordance with claim 27, wherein the filter housing is ring shaped about the outer pressure housing.

31. The gas generator in accordance with claim 27, wherein the gas generator further comprises a collection grating disposed in the outer combustion chamber between the inner pressure housing and the outer pressure housing.

32. The gas generator in accordance with claim 27, wherein the gas generator further comprises an outer chamber compensation piece and an inner chamber compensation piece, said outer chamber compensation piece being disposed within the outer combustion chamber opposite the outer charge igniter, and the inner chamber compensation piece being disposed within the inner combustion chamber opposite the inner charge igniter.

33. The gas generator in accordance with claim 27, further comprising a base plate, said base plate cooperating with the outer pressure housing to define the outer combustion chamber and the inner pressure housing to define the inner combustion chamber, said outer charge igniter and said inner charge igniter being mounted to said base plate.

34. The gas generator in accordance with claim 33, wherein the filter housing is disposed about the outer pressure housing and the base plate.

35. The gas generator in accordance with claim 34, wherein the filter outflow opening is spaced apart from the base plate, and the outer outflow opening is adjacent the base plate.

36. The gas generator in accordance with claim 35, wherein the inner outflow opening is spaced apart from the base plate.

37. The gas generator in accordance with claim 27, wherein the filter housing comprises a securing flange for attaching the gas generator to an air bag module.

38. The gas generator in accordance with claim 27, wherein the inner pressure stage comprises an insulating film affixed to an interior surface of the inner pressure housing and overlying the inner outflow opening, and a reverse flow protection affixed to an exterior surface of the inner pressure housing and overlying the inner outflow opening.

39. The gas generator in accordance with claim 27, wherein the inner pressure housing comprises a plurality of inner outflow openings.

* * * * *